(12) United States Patent
Yonetani et al.

(10) Patent No.: US 6,603,919 B1
(45) Date of Patent: Aug. 5, 2003

(54) AUTOMATIC TITLE REGISTRATION DEVICE OF VIDEO SIGNAL RECORDER

(75) Inventors: Naoki Yonetani, Osaka (JP); Michihiro Fujiyama, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/147,783

(22) PCT Filed: Sep. 29, 1997

(86) PCT No.: PCT/JP97/03477

§ 371 (c)(1),
(2), (4) Date: Mar. 8, 1999

(87) PCT Pub. No.: WO98/14943

PCT Pub. Date: Apr. 9, 1998

(30) Foreign Application Priority Data

Sep. 30, 1996 (JP) ............................................. 8-259629

(51) Int. Cl.[7] .............................. H04N 5/91; H04N 7/00
(52) U.S. Cl. ............................................ 386/46; 386/83
(58) Field of Search .............................. 386/46, 83, 52, 386/1, 4, 95, 55, 92; 360/32; 725/39, 53, 87, 101; H04N 5/91, 7/00

(56) References Cited

U.S. PATENT DOCUMENTS 4,977,455 A * 12/1990 Young
5,541,738 A * 7/1996 Mankovitz

FOREIGN PATENT DOCUMENTS

| JP | 6-52654 | * 2/1994 |
| JP | 7-21748 | * 1/1995 |
| JP | 7-320336 | * 12/1995 |

* cited by examiner

Primary Examiner—Robert Chevalier
(74) Attorney, Agent, or Firm—Arent Fox Kintner Plotkin & Kahn, PLLC

(57) ABSTRACT

The present invention automatically provides a title of a recording medium such as a tape cassette in a manner that service data of a broadcast program extracted by a data extraction circuit 6 is analyzed at a digital data analysis section 91, and when a title of the program is obtained by the analysis section, the program title is registered in a memory 8 as a title of the recording medium such as a tape cassette currently being recorded.

6 Claims, 2 Drawing Sheets

AUTOMATIC TITLE REGISTRATION DEVICE OF VIDEO SIGNAL RECORDER

TECHNICAL FIELD

The present invention relates to a tape title automatic registration apparatus for a video tape recorder (VTR) or the like.

BACKGROUND ART

In general, for example, a label is pasted on a tape cassette in order to record information representing what is recorded on the cassette tape.

Further, there has been proposed another method in which a user manually records a tape title magnetically at a suitable portion on a magnetic tape.

However, each of the aforesaid conventional methods is very inconvenient since a user must manually provide a tape title.

Accordingly, an object of the present invention is to solve the aforesaid conventional problem.

DISCLOSURE OF THE INVENTION

The invention according to claim 1 is an automatic registration apparatus of a title of a recording medium for a video signal recording apparatus which comprises:
- a service data extraction means for extracting service data of program information;
- an extraction means for extracting program title information from the service data; and
- a title registration means for, in a case where the program title information is obtained at a time of recording a video signal on a recording medium, automatically registering a program title obtained from the program title information in a memory as a title of the recording medium.

The invention according to claim 2 is the automatic registration apparatus of a title of a recording medium for a video signal recording apparatus which is characterized in claim 1 that an identification signal is recorded on the recording medium to which the title of the recording medium is applied, and the identification signal is recorded in the memory together with the title of the recording medium.

The invention according to claim 3 is the automatic registration apparatus of a title of a recording medium for a video signal recording apparatus which is characterized in claim 1 that in a case where a title of the recording medium currently being recorded has not been registered, the title of the recording medium is registered in the memory.

The invention according to claim 4 is the automatic registration apparatus of a title of a recording medium for a video signal recording apparatus which is characterized in claim 1 that in a case where a title of the recording medium currently being recorded has not been registered and the program title is not obtained from the video signal currently being recorded, date and time at a time of recording the video signal is automatically registered in the memory instead of the program title.

The invention according to claim 5 is the automatic registration apparatus of a title of a recording medium for a video signal recording apparatus which is characterized in that the service data extraction means extracts the service data of program information superimposed in a vertical blanking period of the video signal.

The invention according to claim 5 is the automatic registration apparatus of a title of a recording medium for a video signal recording apparatus which is characterized in that the video signal recording apparatus is a video tape recorder and the recording medium is a video cassette tape.

BEST MODE FOR CARRYING OUT THE INVENTION

An embodiment of the present invention will be explained with reference to the accompanying drawings.

Figure 1:
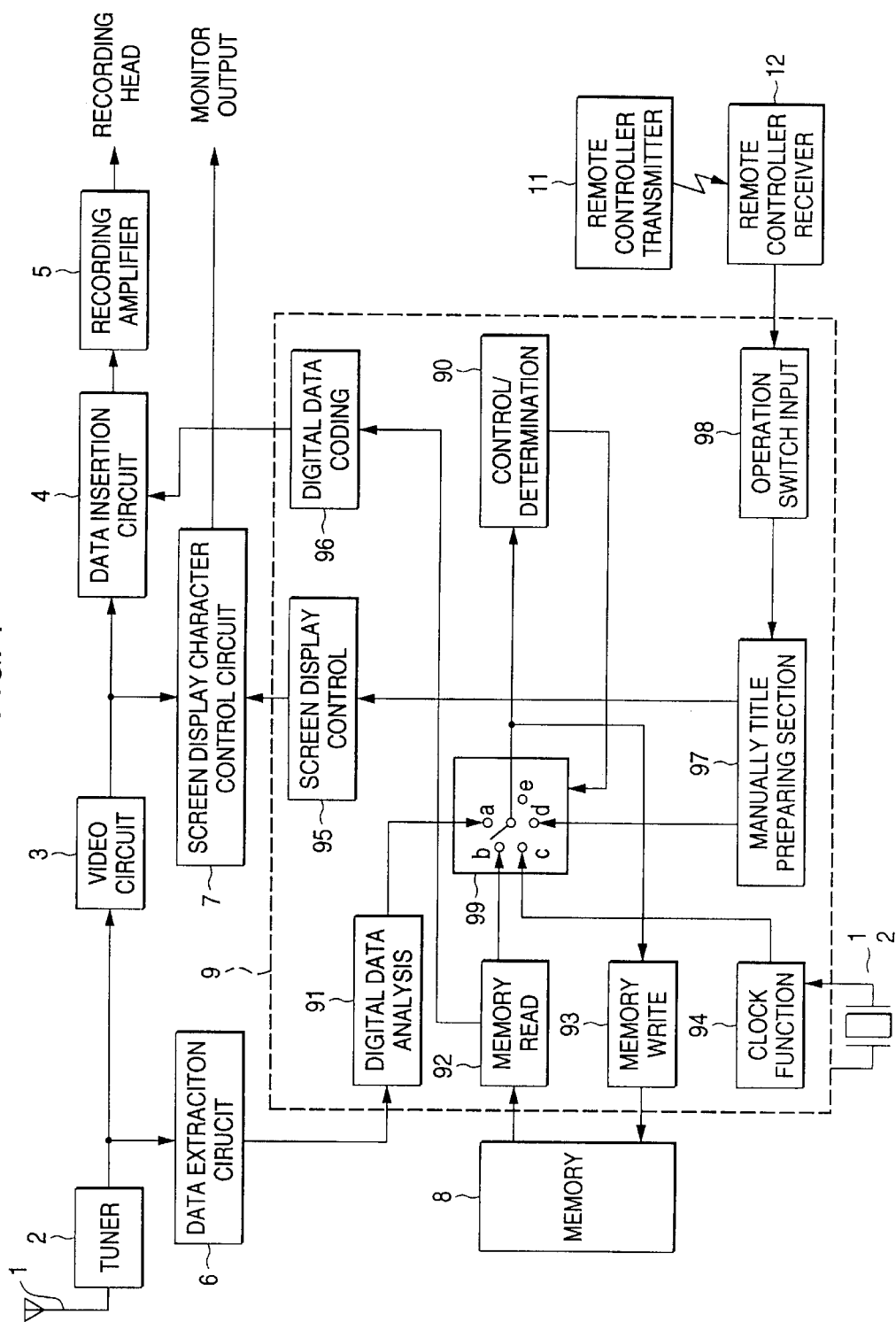
FIG. 1 is a block diagram showing a main part of a video tape recorder (VTR) to which the present invention is applied.

FIG. 1 is a block diagram showing a main part of a VTR to which the present invention is applied, wherein broadcast radio wave is received by an antenna 1, then broadcast signals are transmitted to a tuner 2 which in turn selects the received broadcast signal and supplies to a video circuit 3. The output of the video circuit 3 is supplied to a recording head through a data insertion circuit 4, a recording amplifier 5 and recorded on a magnetic tape.

Among a plurality of broadcasting stations the broadcast radio waves from which are received by the antenna 1, a particular broadcasting station superimposes data representing the title of a program being broadcasted as service data on a particular line within a vertical blanking period of the video signal and transmits the video signal thus superimposed.

This service data is extracted by a data extraction circuit 6 and supplied to a digital data analysis section 91 of a microcomputer 9 and then decoded.

A reference numeral 8 depicts a random access memory (RAM) which is a memory for storing a title of a program or the like as well as a tape title recorded by the method described later. A reference numeral 7 depicts a screen display character control circuit which, when a user manually prepares a title, superimposes characters to be displayed on a monitor screen (characters to be on-screen displayed) on the image signal of the broadcast signal or generates the video signal in addition to the broadcast signal thereby to superimpose characters on the video signal. A reference numeral 12 depicts a crystal oscillation circuit for supplying a clock signal to the microcomputer 9. A reference numeral 10 depicts an IR (infrared ray) remote control signal receiving circuit which supplies a remote control signal to the microcomputer as a digital signal. A reference numeral 11 depicts an IR remote controller transmitter which transmits a switch signal necessary for preparing a title manually.

Within the microcomputer 9, a reference numeral 91 depicts a digital data analysis section which analyzes the digital data inputted from the data extraction circuit 6 and, when there is a title of a program currently being broadcasted in the digital data, outputs the program title.

A reference numeral 92 depicts a memory read section which performs an operation to read a tape title of a tape currently being recorded. According to this reading operation, it can be determined whether a tape tile has been registered or not. When it is determined that a tape title has been registered, the tape title is read and outputted.

A reference numeral 93 depicts a memory write section which outputs an automatically or manually prepared tape title to the memory 8.

A reference numeral 94 depicts a clock function section which performs a clock function and also outputs the current date and time.

A reference numeral 98 depicts an operation switch input section which analyzes the signal transmitted from the remote controller transmitter 11 as the switch signal and outputs the switch signal to the manually title preparing section 97.

In a manually title preparing mode, the manually title preparing section 97 manually edits a character sequence of a tape title in accordance with the switch signal inputted from the operation switch input section 98 and outputs the manually prepared tape title.

A reference numeral 95 depicts a screen display control section which outputs display character data to the screen display character control circuit 7.

A reference numeral 99 depicts a tape title selection section which operates in accordance with the flow chart described later and basically selects what is to be registered as a tape title for a tape currently being recorded.

A reference numeral 90 depicts a decision and control section which receives the output of the tape title selection section 99 thereby to determine the signals being inputted into the selection section 99 and control the selection section.

A reference numeral 96 depicts a digital data coding section which always receives all information (to be backed up) of the memory read through the memory read section 92 thereby to code the received data in a state being recorded on a magnetic tape and output to the data insertion circuit 4.

An identification signal is recorded on a cassette tape to which the tape title is applied and the identification signal is stored in the memory together with the tape title.

Figure 2:
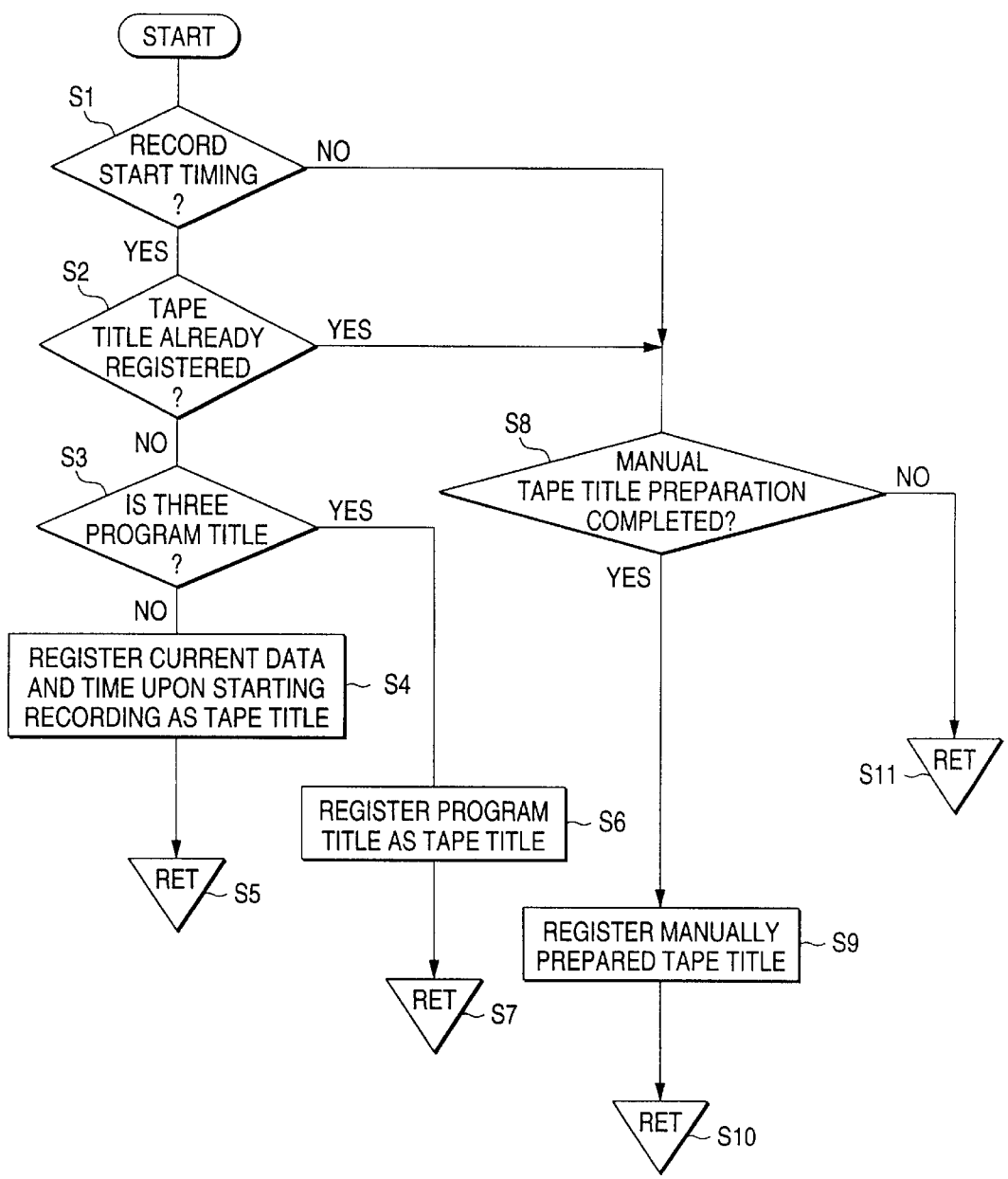
FIG. 2 is a diagram showing a flow chart used for explaining the tape title registration operation according to the present invention.

The title automatic registration operation according to the present invention will be explained with reference to the flow chart shown in FIG. 2.

That is, in step 1, it is determined whether or not it is the record start timing. If it is determined that it is the record start timing, the process proceeds to step 2, while if it is determined that it is not the record start timing, the process proceeds to step 8.

In step 2, it is determined in accordance with the information inputted from the memory 8 whether or not a tape title has been already registered as to the magnetic tape on which recording operation is currently started. If it is determined that the tape title has been registered, the process proceeds to step 8, whilst if it is determined that the tape title has not been registered, the process proceeds to step 3 (the tape title selection section 99 selects a terminal a at this time).

In step 3, the decision and control section inputs a program title at the record start timing from the digital data analysis section 91 (the tape title selection section 99 selects a terminal a at this time). If the program title is inputted, the process proceeds to step 8, whilst if the program title is not inputted, the process proceeds to step 4.

When the process proceeds to step 4, the decision and control section automatically inputs current date and time from the clock function section 94 (the tape title selection section 99 selects a terminal c at this time) and registers this date and time in the memory 8 as a tape title, and the process proceeds to step 5.

In step 5, the series of decision and operation processes are temporarily terminated, and thereafter the process returns to the process start point and performs the decision and processing again.

In step 3, if it is determined that there is a program title, the process proceeds to step 6. In step 6, the program title inputted from the digital data analysis section 91 is automatically registered in the memory as a tape title and then the process proceeds to step 7.

In step 7, the series of decision and operation processes are temporarily terminated, and thereafter the process returns to the process start point and performs the decision and processing again.

When it is determined in step 1 that it is not the record start timing or when it is determined in step 2 that a tape title has been already registered in the memory, the process proceeds to step 8. In the case where the process proceeds to step 8, if the manually prepared title has been completed and inputted from the manually title preparing section 97, the process proceeds to step 9, whilst if the manually prepared title has not been completed, the process proceeds to step 11 (the tape title selection section 99 selects a terminal d at this time).

In step 9, when a tape title is newly prepared even if the automatically prepared tape title is registered or a tape tile already exists, the newly prepared tape title is overwritten and registered, and the process proceeds to step 10.

In step 10, the series of decision and operation processes are temporarily terminated, and thereafter the process returns to the process start point and performs the decision and processing again.

In step 8, if it is determined that the manually prepared title has not been completed, the process proceeds to step 11.

In step 11, without newly registering a tape title in the memory, the series of decision processes are temporarily terminated, and thereafter the process returns to the process start point and performs the decision and operation processes again.

(When the registration of a tape title is not performed, the tape title selection section selects a terminal e.)

Although the embodiment has been explained that the microcomputer 9 is formed by the digital data analysis section 91, memory read section 92, memory write section 93, clock function section 94, screen display control section 95, digital data coding section 96, manually title preparing section 97 and operation switch input section 98, these sections are functional blocks and actually configured by the software of the microcomputer.

INDUSTRIAL APPLICABILITY

According to the present invention, so long as a broadcasting station transmits a program title, the program title is automatically fetched as a tape title. Accordingly, a user is not required to take a trouble to manually write the tape title and hence very convenient.

In contrast, when a broadcasting station does not transmit a program title, date and time upon recording is recorded as a tape title, so that it is convenient since the tape title thus recorded will be a clue to know the contents of the tape.

We claim:

1. An automatic registration apparatus of a title of a recording medium for a video signal recording apparatus, comprising:

a service data extraction means for extracting service data of program information;

a extraction means for extracting program title information from the service data; and a title registration means for, in a case where the program title information is obtained at a time of recording a video signal on a recording medium, automatically registering a program title obtained from the program title information in a memory as a title of the recording medium, characterized in that in a case where a title of the recording medium currently being recorded has not been registered and the program title is not obtained from the video signal currently being recorded, date and time at a time of recording the video signal is automatically registered in said memory instead of the program title.

2. An automatic registration apparatus of a title of a recording medium for a video signal recording apparatus according to claim 1, characterized in that an identification signal is recorded on the recording medium to which the title of the recording medium is applied, and the identification signal is recorded in said memory together with the title of the recording medium.

3. An automatic registration apparatus of a title of a recording medium for a video signal recording apparatus according to claim 1, characterized in that in a case where a title of the recording medium currently being recorded has not been registered, the title of the recording medium is registered in said memory.

4. An automatic registration apparatus of a title of a recording medium for a video signal recording apparatus according to claim 1, characterized in that said service data extraction means extracts the service data of program information superimposed in a vertical blanking period of the video signal.

5. An automatic registration apparatus of a title of a recording medium for a video signal recording apparatus according to claim 1, characterized in that said video signal recording apparatus is a video tape recorder and the recording medium is a video cassette tape.

6. An automatic registration apparatus of a title of a recording medium for a video signal recording apparatus according to claim 1, further comprising:

a manually title preparing section for editing a character sequence of a tape title;

wherein in a case where a title has been manually entered, the title manually entered is automatically registered in said memory instead of the program title.

\* \* \* \* \*